(12) United States Patent
Vollet et al.

(10) Patent No.: US 8,186,036 B2
(45) Date of Patent: May 29, 2012

(54) METAL SHEET, METHOD FOR FIXING SAID METAL SHEET BY FLOW DRILLING AND ASSEMBLY COMPRISING SAME

(75) Inventors: Ludovic Vollet, Neauphle le chateau (FR); Abdelghani Rayeh, Blanc Mesnil (FR); Daniel Dijols, Boulogne (FR)

(73) Assignee: RENAULT s.a.s., Boulogne Billancourt (FR)

( * ) Notice: Subject to any disclaimer, the term of this patent is extended or adjusted under 35 U.S.C. 154(b) by 29 days.

(21) Appl. No.: 12/838,543

(22) Filed: Jul. 19, 2010

(65) Prior Publication Data
US 2010/0275669 A1 Nov. 4, 2010

Related U.S. Application Data

(62) Division of application No. 11/719,445, filed as application No. PCT/FR2005/050910 on Oct. 27, 2005, now Pat. No. 7,976,237.

(30) Foreign Application Priority Data

Nov. 16, 2004 (FR) ..................................... 04 52640

(51) Int. Cl.
*B23P 11/00* (2006.01)
*B21D 31/00* (2006.01)

(52) U.S. Cl. ........................................ 29/525.01; 72/324
(58) Field of Classification Search ............... 29/525.01, 29/525.11, 428, 432, 505; 72/324; 403/167, 403/168, 200, 283, 408.1; 16/382
See application file for complete search history.

(56) References Cited

U.S. PATENT DOCUMENTS 1,695,476 A 12/1928 Winkler
6,038,740 A * 3/2000 Hoger et al. .................... 16/382

FOREIGN PATENT DOCUMENTS

DE 198 01 654 7/1999
FR 2 762 045 10/1998

* cited by examiner

*Primary Examiner* — John C Hong
(74) *Attorney, Agent, or Firm* — Oblon, Spivak, McClelland, Maier & Neustadt, L.L.P.

(57) ABSTRACT

A method of flow drilling a metal sheet includes flow drilling the metal sheet to produce a tubular extension from a surface of the metal sheet. The flow drilling is performed by forming two parts in the tubular extension, including an external part defining a hole of constant diameter and a seating part between the metal sheet and the external part. A cross-sectional shape of the seating part is hexagonal.

8 Claims, 1 Drawing Sheet

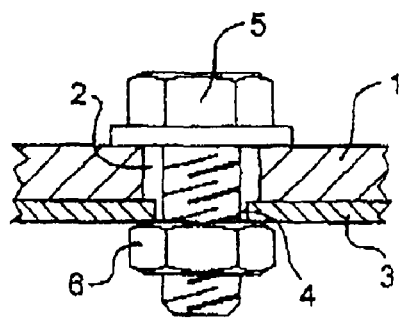
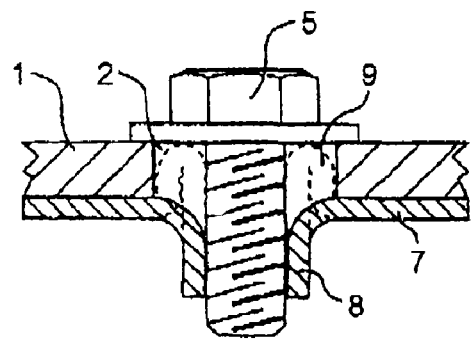
FIG. 1A
Prior Art
FIG. 1B
Prior Art
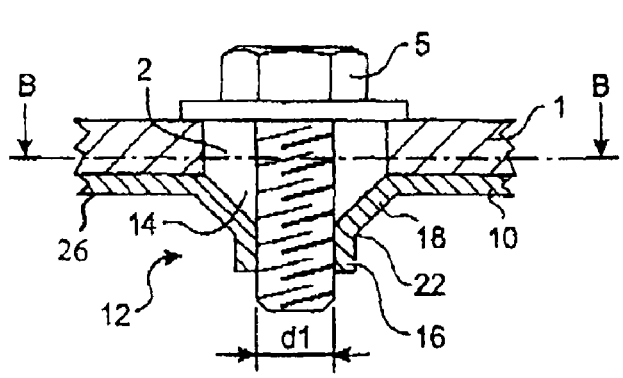
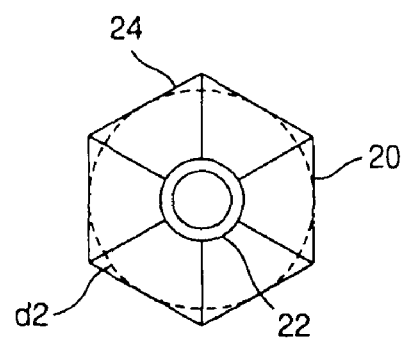
FIG. 2A
FIG. 2B

METAL SHEET, METHOD FOR FIXING SAID METAL SHEET BY FLOW DRILLING AND ASSEMBLY COMPRISING SAME

CROSS-REFERENCE TO RELATED APPLICATIONS

This application is a divisional application of pending U.S. application Ser. No. 11/719,445 filed on Aug. 27, 2008, which is herein incorporated by reference, which is the National Stage Application of PCT/FR05/50910 filed Oct. 27, 2005, which claims the benefit of priority from French Patent Application No. 04 52640 filed Nov. 16, 2004.

TECHNICAL FIELD

The invention relates to the field of assemblies on thin metal sheet, and in particular relates to the fastening of an element to a sheet by screwing into a tapped hole in the sheet.

The invention relates in particular to a method of flow drilling and to a sheet which has been pressed in this way.

DESCRIPTION OF THE PRIOR ART

In the automotive industry, numerous assemblies on thin sheet are performed. One of the solutions adopted involves clinching nuts. Thus, for example, as illustrated in FIG. 1A, in the hood of certain vehicles, a hood hinge 1 comprising assembly holes 2 needs to be fastened to a hinge support 3 of the order of 1.2 mm thick, for example made of sheet metal of the "XES" type: the support 3 is holed 4, and the hinge 1 and the support 3 are fastened using a screw 5 of the M6 type, to a tightening torque of 15 N/m using a nut 6 crimped to the support 3.

Although this assembly using screws 5 and nuts 6 provides a reliable fastening, it does have its disadvantages. In particular, the fitting of the nut 6, whether it is crimped or welded in place, is awkward and expensive, thus adding to the cost of the nut per se.

An alternative has been developed for fastening sensors to the cylindrical sheet of exhaust pipes, and this alternative is set out, for example, in document FR-A-2 762 045: as depicted diagrammatically in FIG. 1B, it has been proposed that the sheet be flow drilled, and that the bushing thus formed and tapped be used to perform fastening using a screw.

This technique does, however, pose problems, illustrated in FIG. 1B, in the case of thin sheet 7, particularly sheet less than 1.5 mm thick, and in the case of assemblies to an element 1 the fixing orifice 2 of which is large in size, very much exceeding the diameter of the screw 5: in the case of the preceding example, it was found when screwing into the flow tapped extension 8, that the latter would deform 9, sometimes even to the point of breaking, at the usual tightening torques. Now, the tightening torque for a fastening inside a motor vehicle cannot simply be reduced at will without leading to safety risks, and the thickness of the sheet metal used has been optimized for weight, reliability and cost reasons.

SUMMARY OF THE INVENTION

The invention proposes to use the flow drilling method for the fastening but at the same time alleviating the existing problems.

More generally, an assembly according to the invention employs a method of pressing a metal sheet, even when this sheet is thin.

In one of its aspects, the invention relates to a flow drilling method which creates a tubular assembly extension on the sheet, this extension comprising a conical seating part. By virtue of this seating part, which is somewhere between the sheet and the hole, which will advantageously be tapped, loads are spread at the time of assembly and the tubular extension neither deforms nor breaks. There is thus the possibility of tightening the screws to the usual tightening torques, even in the case of sheet less than 1.5 mm thick.

In another aspect, the invention relates to a sheet which has undergone flow drilling such as this and can be assembled, for example by screwing, by virtue of the tubular extension thus created.

The sheet according to the invention has a tubular extension in two parts. The hole passing through the tubular extension comprises an inscribed circle the diameter of which decreases in the part of the extension adjacent to the sheet, and the hole is of a constant diameter in the external part of the extension. Advantageously, in the external part, the hole is tapped.

According to a preferred embodiment, the hole formed in the sheet is of hexagonal cross section.

The sheet may be less than 1.5 mm thick and, in particular, the sheet may be a car hood hinge support exhibiting four flow drillings according to the invention.

The sheet may be assembled using a screw screwed into the tapped hole, for example in a car hood.

BRIEF DESCRIPTION OF THE DRAWINGS

The features and advantages of the invention will be better understood from reading the description which will follow and with reference to the attached drawings, given by way of entirely nonlimiting illustration.

FIG. 1A, which has already been described, depicts a hood hinge assembly according to the prior art; FIG. 1B, which has already been described, shows a flow drilling according to the prior art for such an assembly.

FIGS. 2A and 2B show an assembly according to a preferred embodiment of the present invention.

DETAILED DESCRIPTION OF SOME PARTICULAR EMBODIMENTS

The description which follows relates to the same example as before, namely to the fastening using screws 5 of the M6 type, with a tightening torque of the order of 15 N/m, on car body panel sheets. In particular, in FIG. 2A also, a hood hinge 1 is fastened to a hinge support 10 of thickness 1.2 mm made of sheet metal of the "XE 320D" type. Customarily, four fastening points are used. However, the applications may of course differ, particularly in terms of the diameter of the screw 5, the tightening torque, or the material of the metal sheet 10.

Prior to assembly, the sheet 10 will have undergone flow drilling according to the invention.

Flow drilling consists in drilling a wall using a tool, for example one made of tungsten carbide, at a speed (of the order of 1000 to 5000 rpm) and a penetration force which are such that the local rise in temperature causes the material of the wall to melt. Because of its plasticity, the material of the wall is upset around the tool as the latter gradually advances. A tubular extension 12 that projects on one side of the sheet 10 is thus formed. The length of the tubular extension and the internal diameter d1 of the hole 14 at its distal end can be adapted to suit. In particular, the hole 14 may be tapped for a screw fastener.

In the case of the assemblies as diagrammatically depicted, the assembly orifice 2 of the element 1 to be assembled with the sheet 10 is of a size very much greater than the diameter of the screw 5 used, that is to say than the diameter d1 of the hole 14 obtained in the distal part of the tubular extension 12.

In order to spread the loads across the walls of the tubular extension 12, the latter comprises two parts. The first part 16 of the tubular extension 12, or external or distal part, is similar to conventional extensions 8: the interior hole 14 is of a substantially constant diameter d1. Advantageously, this part 16 may then be tapped, for example using a technique that does not involve the removal of material by deforming the first part 16 of the tubular extension 12.

The second part 18 of the tubular extension 12 forms its seating: it is contained between the "non-deformed" surface 26 of the sheet 10 of which it forms an integral part, and the first part 16, which is also as one with it. The second part 18 is of conical overall shape. In particular, the interior hole 14 of the tubular extension 12 is of a conical shape in this second part 18, that is to say that the circle 20 inscribed inside the hole 14 has a diameter d2 that decreases, advantageously continuously, between the sheet 10 and the meeting point 22 of the first and second parts 16, 18.

The hole 14 at the sheet 10 end can be of any overall shape 24. In particular, the hole may, as usual, be circular, centered on the same axis as the first part 16 of the tubular extension 12.

According to a preferred embodiment, the hole 14 is of hexagonal shape 24 where the second part 18 connects to the surface 26 of the sheet 10, as depicted in FIG. 2B. For example, each side of the hexagon 24 may measure 4 mm, so that it can be inscribed inside a circle the diameter of which measures 12 mm, the final diameter of the tap d1 being 8 mm; the height of the first part 16 may be 5 mm, for a conical seating 18 measuring 5 mm in length. These dimensions need to be understood to contain margins of error and so in fact $7 \leq d1 \leq 9$ mm.

Such a profile may be obtained in various passes of pressing, using a tool whose dimensions, for example length, can be adapted to suit the number of passes needed. By way of example, the various pressing passes may follow a first conventional pressing pass known as balling-up.

The sheet 10 according to the invention may relate to any vehicle part, particularly one less than 1.5 mm thick, and involve the usual tightening torques, or even higher ones. With this thin sheet, it is therefore possible, thanks to the invention, to produce a fastening by flow tapping with a conical seating whose base is hexagonal.

The invention claimed is:

1. A method of flow drilling a metal sheet, comprising:
    flow drilling said metal sheet, thereby producing a tubular extension from a surface of the metal sheet;
    wherein said flow drilling is performed by forming two parts in said tubular extension, an external part defining a hole of constant diameter and a seating part between said metal sheet and said external part, a cross-sectional shape of the seating part is hexagonal.

2. The method as claimed in claim 1, further comprising tapping of the hole in the external part.

3. A method of assembling a hood hinge to a metal sheet, comprising:
    providing said hood hinge;
    flow drilling said metal sheet according to the method as claimed in claim 1; and
    fastening said hood hinge to said metal sheet with screws in said hole.

4. The method as claimed in claim 1, wherein a circle inscribed in the seating part has a decreasing diameter from the surface of the metal sheet to the external part.

5. The method as claimed in claim 1, wherein a circle inscribed in the seating part has a continuously decreasing diameter from the surface of the metal sheet to the external part.

6. The method as claimed in claim 1, wherein the metal sheet has a thickness of 1.2 mm.

7. The method as claimed in claim 1, wherein the flow drilling said metal sheet includes drilling the sheet with a tool made of tungsten carbide at a speed and a penetration force such that a local rise in temperature causes the metal sheet to melt to produce the tubular extension.

8. The method as claimed in claim 7, wherein the speed is 1000 to 5000 rpm.

* * * * *